(12) United States Patent
Ohta et al.

(10) Patent No.: US 12,473,665 B2
(45) Date of Patent: Nov. 18, 2025

(54) PRODUCTION METHOD OF CARBON NANOTUBE YARN

(71) Applicant: TOKUSEN KOGYO CO., LTD., Ono (JP)

(72) Inventors: Eiji Ohta, Kobe (JP); Hiroyuki Ohue, Miki (JP)

(73) Assignee: TOKUSEN KOGYO CO., LTD., Hyogo (JP)

( * ) Notice: Subject to any disclaimer, the term of this patent is extended or adjusted under 35 U.S.C. 154(b) by 776 days.

(21) Appl. No.: 17/778,554

(22) PCT Filed: Oct. 22, 2020

(86) PCT No.: PCT/JP2020/039777
§ 371 (c)(1),
(2) Date: May 20, 2022

(87) PCT Pub. No.: WO2021/131282
PCT Pub. Date: Jul. 1, 2021

(65) Prior Publication Data
US 2023/0029437 A1    Jan. 26, 2023

(30) Foreign Application Priority Data

Dec. 27, 2019  (JP) ................. 2019-238936

(51) Int. Cl.
*B82Y 40/00* (2011.01)
*C01B 32/168* (2017.01)
(Continued)

(52) U.S. Cl.
CPC ............ *D02G 3/16* (2013.01); *C01B 32/168* (2017.08); *D02G 3/26* (2013.01); *B82Y 30/00* (2013.01);
(Continued)

(58) Field of Classification Search
CPC ............ B82Y 40/00; D02G 3/26; D02G 3/16
See application file for complete search history.

(56) References Cited

U.S. PATENT DOCUMENTS

2007/0166223 A1* 7/2007 Jiang ................ D02G 3/16
423/460
2010/0065981 A1* 3/2010 Liao .................. D06M 13/127
264/165
(Continued)

FOREIGN PATENT DOCUMENTS

CN     210151288 U   *  3/2020
EP       3026153 A1  *  6/2016  ............ D01H 1/04
(Continued)

OTHER PUBLICATIONS

International Search Report for PCT/JP2020/039777 dated, Dec. 8, 2020 (PCT/ISA/210).

*Primary Examiner* — Tajash D Patel
(74) *Attorney, Agent, or Firm* — Sughrue Mion, PLLC

(57) ABSTRACT

A production method of a carbon nanotube yarn includes the steps of: (1) obtaining a web 40 including a large number of carbon nanotubes 36; (2) bringing a slider 24a into contact with the carbon nanotubes 36; and (3) moving the slider 24a in a direction to bundle the carbon nanotubes 36, the direction being inclined with respect to a direction in which the web 40 extends.

8 Claims, 13 Drawing Sheets

(51) Int. Cl.
*D02G 3/16* (2006.01)
*D02G 3/26* (2006.01)
*B82Y 30/00* (2011.01)

(52) U.S. Cl.
CPC ......... *B82Y 40/00* (2013.01); *D10B 2101/122* (2013.01)

(56) References Cited

U.S. PATENT DOCUMENTS

| | | | |
|---|---|---|---|
| 2011/0316183 A1* | 12/2011 | Lashmore | D04H 1/728 425/73 |
| 2017/0362089 A1 | 12/2017 | Ovalle et al. | |
| 2023/0009040 A1* | 1/2023 | Ohta | C01B 32/168 |

FOREIGN PATENT DOCUMENTS

| | | | | |
|---|---|---|---|---|
| JP | 2011-153392 A | | 8/2011 | |
| JP | 2016190982 A | * | 11/2016 | |
| WO | WO-2015011770 A1 | * | 1/2015 | ......... B65H 54/2893 |
| WO | 2016/080526 A1 | | 5/2016 | |
| WO | WO-2019216067 A1 | * | 11/2019 | |
| WO | WO-2020138378 A1 | * | 7/2020 | ........... C01B 32/162 |
| WO | WO-2021054154 A1 | * | 3/2021 | ............. C01B 32/16 |

* cited by examiner

PRODUCTION METHOD OF CARBON NANOTUBE YARN

CROSS REFERENCE TO RELATED APPLICATIONS

This application is a National Stage of International Application No. PCT/JP2020/039777 filed Oct. 22, 2020, claiming priority based on Japanese Patent Application 2019-238936 Dec. 27, 2019.

TECHNICAL FIELD

The present invention relates to a production method of a yarn made of carbon nanotubes.

BACKGROUND ART

Carbon nanotubes are excellent in electrical conductivity, thermal conductivity, and specific strength. The use of carbon nanotubes has been studied in diverse fields. Each carbon nanotube is microscopic. Thus, an assembly of a large number of carbon nanotubes can be used as a structural element. Known examples of the assembly are webs and yarns.

Carbon nanotubes can be produced by chemical vapor deposition. This process gives an array of carbon nanotubes. In this array, a large number of carbon nanotubes are oriented in a given direction. The carbon nanotubes are gradually drawn from the array. The drawn carbon nanotubes form a web. The web is in the form of a sheet.

Japanese Laid-Open Patent Application Publication No. 2011-153392 discloses a carbon nanotube yarn. In the method of this literature, a web is twisted to produce the carbon nanotube yarn. The yarn obtained by the production method has a low density of the carbon nanotubes.

CITATION LIST

Patent Literature

PTL 1: Japanese Laid-Open Patent Application Publication No. 2011-153392

SUMMARY OF INVENTION

Technical Problem

Die processing of a web can lead to carbon nanotubes being bundled at a high density. However, the work of passing the web through a die is difficult since the carbon nanotubes are microscopic. In the die processing, the carbon nanotubes are rubbed against the die, and thus the yarn surface is fuzzed. The fuzz deteriorates the quality of the yarn. Residues resulting from the fuzz could be deposited on the die and hinder smooth die processing. The residues form a small cluster, and the small cluster could mingle in the yarn to cause a local defect (e.g., a nep) of the yarn.

An object of the present invention is to provide a production method that yields a carbon nanotube yarn having high density and high quality.

Solution to Problem

A production method of a carbon nanotube yarn according to the present invention includes the steps of:
(1) obtaining a web including a large number of carbon nanotubes;
(2) bringing a slider into contact with the carbon nanotubes; and
(3) moving the slider in a direction to bundle the carbon nanotubes, the direction being inclined with respect to a direction in which the web extends.

Preferably, the web contacts the slider in the step (2).

Preferably, the slider used in the steps (2) and (3) is made of a material selected from: a rubber composition containing natural rubber, acrylonitrile-butadiene rubber, or urethane rubber as a base component; a resin composition containing urethane resin or fluororesin as a base component; and a ceramic or metal material.

In another aspect, a production apparatus for a carbon nanotube yarn according to the present invention includes:
a slider that contacts a web including a large number of carbon nanotubes or a bundle obtained from the web; and
a drive mechanism that moves the slider in a direction inclined with respect to a direction in which the web extends.

Preferably, the slider is made of a material selected from: a rubber composition containing natural rubber, acrylonitrile-butadiene rubber, or urethane rubber as a base component; a resin composition containing urethane resin or fluororesin as a base component; and a ceramic or metal material.

In another aspect, a strand according to the present invention includes a large number of carbon nanotubes. The strand includes: a right-twisted portion in which the carbon nanotubes are twisted in an S direction; and a left-twisted portion in which the carbon nanotubes are twisted in a Z direction.

The strand may include a plurality of the right-twisted portions and a plurality of the left-twisted portions. Preferably, the right-twisted portions and the left-twisted portions alternate with one another.

The strand may include an intermediate portion. The intermediate portion is located between the right-twisted and left-twisted portions. The carbon nanotubes are untwisted in the intermediate portion.

Advantageous Effects of Invention

In the production method according to the present invention, the movement of a slider increases the density of carbon nanotubes. The slider does not significantly deteriorate yarn quality. The production method can yield a carbon nanotube yarn having high density and high quality.

DESCRIPTION OF EMBODIMENTS

The following will describe in detail the present invention based on preferred embodiments with appropriate reference to the drawings.

Figure 1:
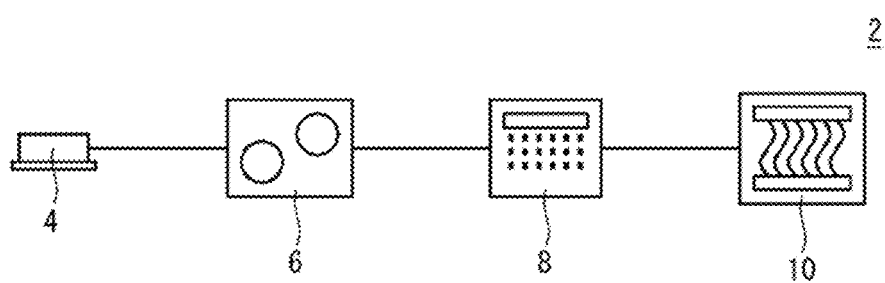
FIG. 1 is a conceptual diagram showing equipment used for a production method according to one embodiment of the present invention.

FIG. 1 shows equipment 2 used for a production method according to one embodiment of the present invention along with an array 4 (which will be described in detail later). The equipment 2 includes a bundler 6, a sprayer 8, and a dryer 10.

Figure 2:
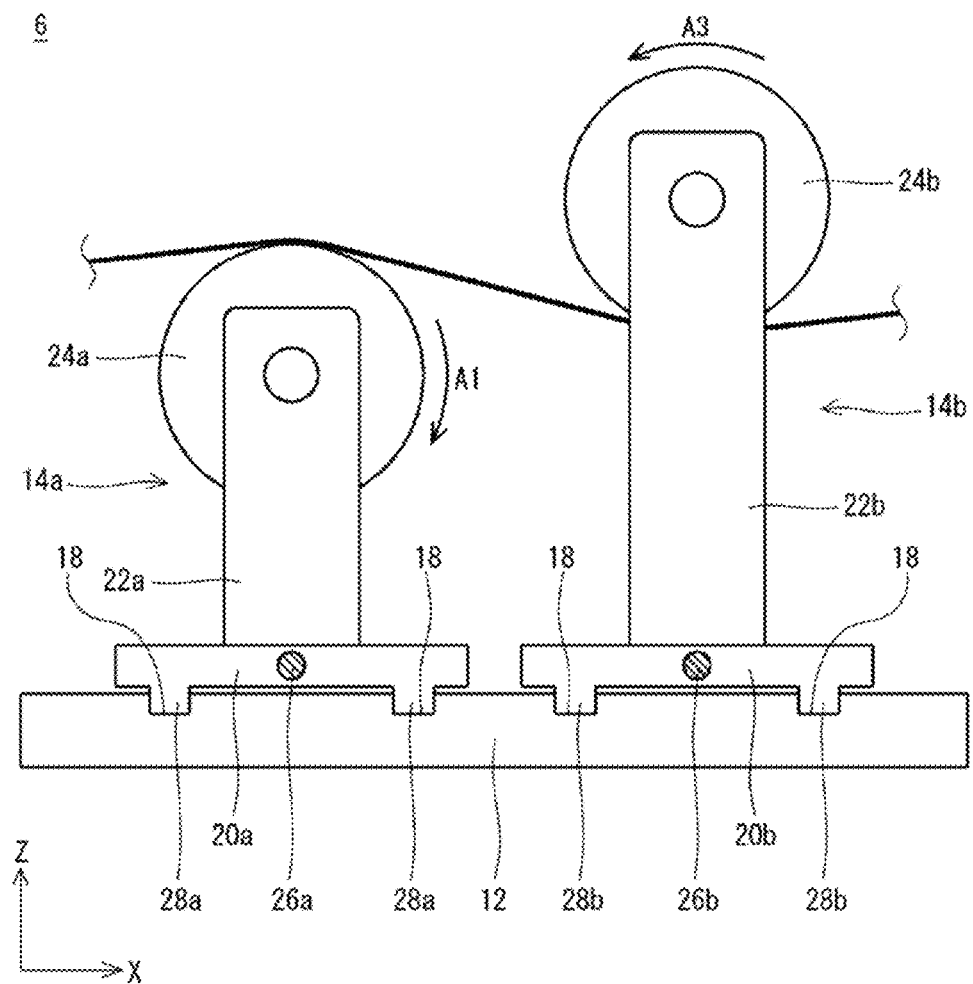
FIG. 2 is a front view showing a bundler of the equipment of FIG. 1.
Figure 3:
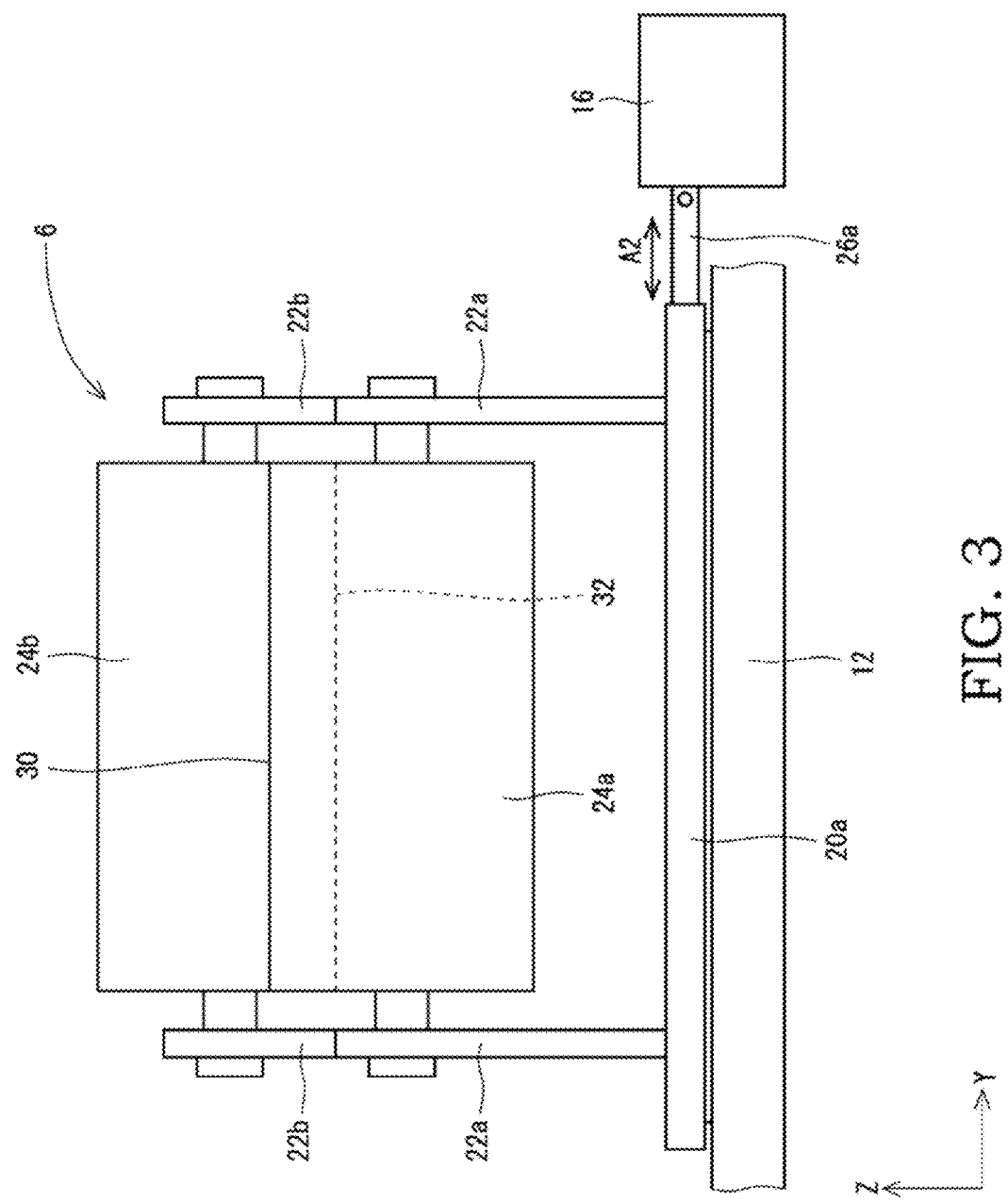
FIG. 3 is a left side view showing the bundler of FIG. 2.

FIG. 2 is a front view showing the bundler 6 of the equipment 2 of FIG. 1. FIG. 3 is a left side view showing the bundler 6 of FIG. 2. The bundler 6 includes a base 12, a first part 14a, a second part 14b, and an actuator 16. The base 12 has four grooves 18 in its upper surface. The first part 14a is located upstream (to the left in FIG. 2) of the second part 14b.

The first part 14a includes a first mount 20a, a pair of first supports 22a, a first roller 24a (slider), and a first arm 26a.

The first mount 20a includes two first rails 28a. Each first rail 28a is fitted in a corresponding one of the grooves 18 of the base 12. The first rails 28a are slidable along the grooves 18. The first mount 20a may include rollers or wheels instead of or in addition to the rails 28a.

Each first support 22a rises from the first mount 20a. The first supports 22a are secured to the first mount 20a. The first roller 24a is mounted to extend between one of the first supports 22a and the other of the first supports 22a. The first roller 24a is rotatable in a direction indicated by the arrow A1 in FIG. 2.

One end of the first arm 26a is coupled to the first mount 20a. As shown in FIG. 3, the first arm 26a extends in the Y direction. The other end of the first arm 26a is coupled to the actuator 16. A typical example of the actuator 16 is a motor. The first arm 26a is driven by the actuator 16 to reciprocate as indicated by the arrow A2 in FIG. 3. The reciprocation is a motion in the Y direction. Along with this reciprocation, the first part 14a is reciprocated in its entirety. The reciprocation of the first part 14a is effected by the first rails 28a being guided by the grooves 18.

The second part 14b includes a second mount 20b, a pair of second supports 22b, a second roller 24b (slider), and a second arm 26b.

The second mount 20b includes two second rails 28b. Each second rail 28b is fitted in a corresponding one of the grooves 18 of the base 12. The second rails 28b are slidable along the grooves 18. The second mount 20b may include rollers or wheels instead of or in addition to the rails 28b.

Each second support 22b rises from the second mount 20b. The second supports 22b are secured to the second mount 20b. The second roller 24b is mounted to extend between one of the second supports 22b and the other of the second supports 22b. The second roller 24b is rotatable in a direction indicated by the arrow A3 in FIG. 2.

One end of the second arm 26b is coupled to the second mount 20b. Although not shown, the second arm 26b extends in the Y direction. The other end of the second arm 26b is coupled to the actuator 16. The second arm 26b is driven by the actuator 16 to reciprocate in the Y direction. Along with this reciprocation, the second part 14b is reciprocated in its entirety. The reciprocation of the second part 14b is effected by the second rails 28b being guided by the grooves 18.

In the present embodiment, as is clear from FIG. 3, a top 30 of the first roller 24a is located above a bottom 32 of the second roller 24b.

Figure 4:
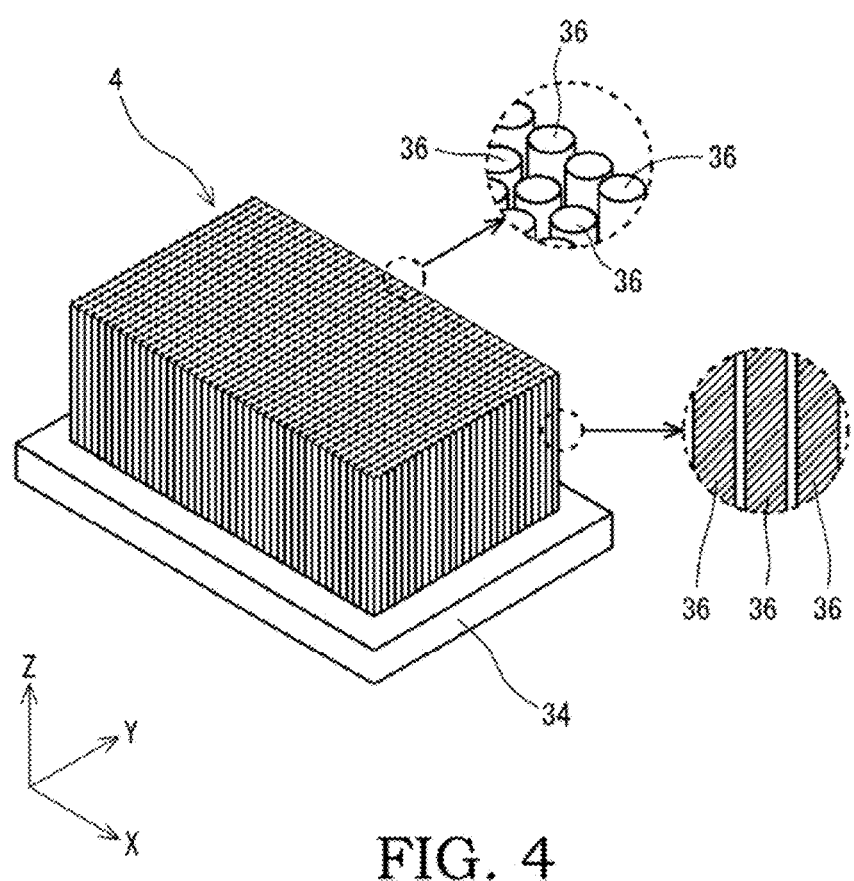
FIG. 4 is a perspective view showing an array used in a production method performed by the equipment of FIG. 1.

In FIG. 4, the array 4 used in the production method performed by the equipment 2 of FIG. 1 is shown along with a substrate 34. The array 4 has the shape of a block. The array 4 is an assembly of a large number of carbon nanotubes 36. For convenience of illustration, the carbon nanotubes 36 are hatched in FIG. 4. The carbon nanotubes 36 are oriented in the thickness direction of the array 4 (Z direction). In other words, each carbon nanotube 36 is substantially upright relative to the substrate 34. Various processes can be used for production of the array 4. A typical process is chemical vapor deposition. In this process, the carbon nanotubes 36 gradually grow upward from the substrate 34.

The diameter of each carbon nanotube 36 is typically from 0.5 to 100 nm. The length of the carbon nanotube 36 is typically from 0.5 μm to 10 mm. The carbon nanotube 36 may have a single-layer structure, double-layer structure, or multi-layer structure. The array 4 may be formed from a plurality of types of carbon nanotubes 36 having different structures.

Figure 5:
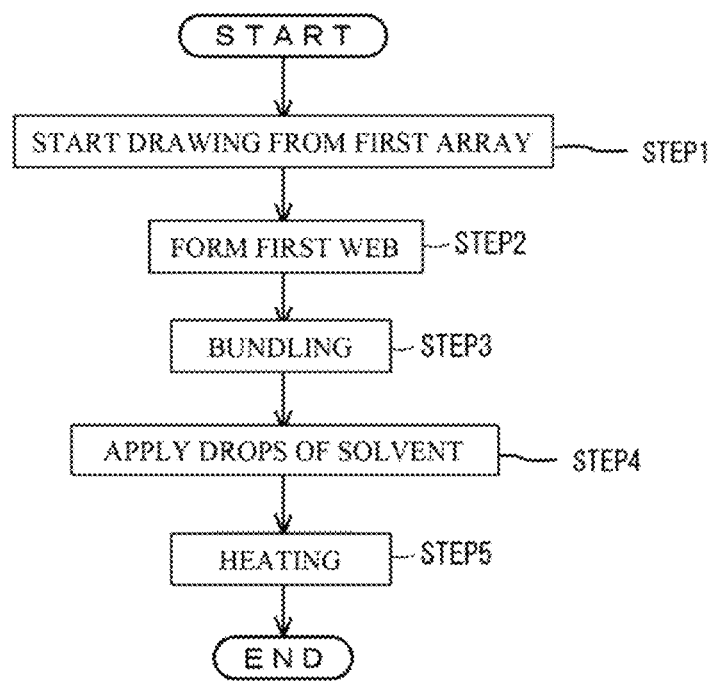
FIG. 5 is a flowchart showing a method of producing a carbon nanotube yarn using the equipment of FIG. 1.

FIG. 5 is a flowchart showing a method of producing a carbon nanotube yarn using the equipment 2 of FIG. 1. In this production method, first, drawing of the carbon nanotubes 36 from the array 4 is started (STEP 1).

Figure 6A:
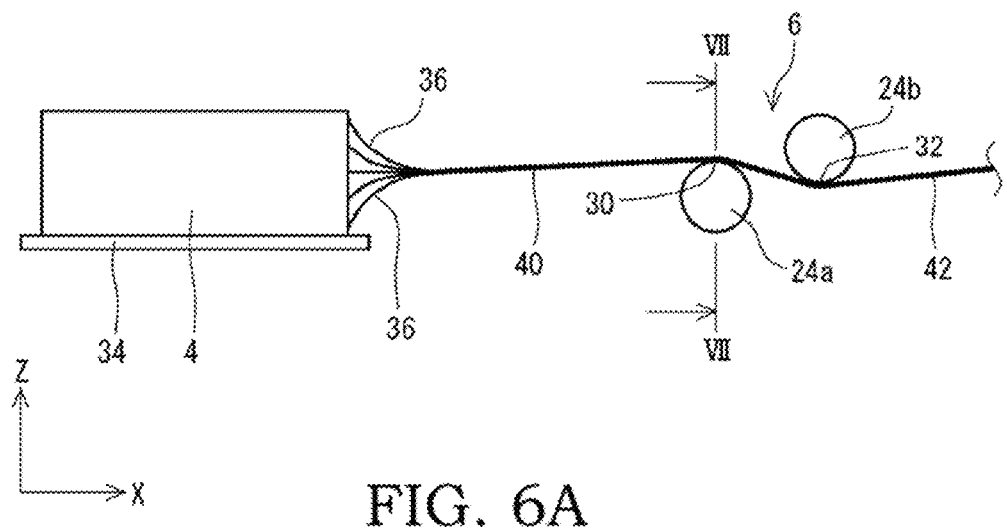
FIG. 6A is a front view showing one step of the production method of FIG. 5.
Figure 6B:
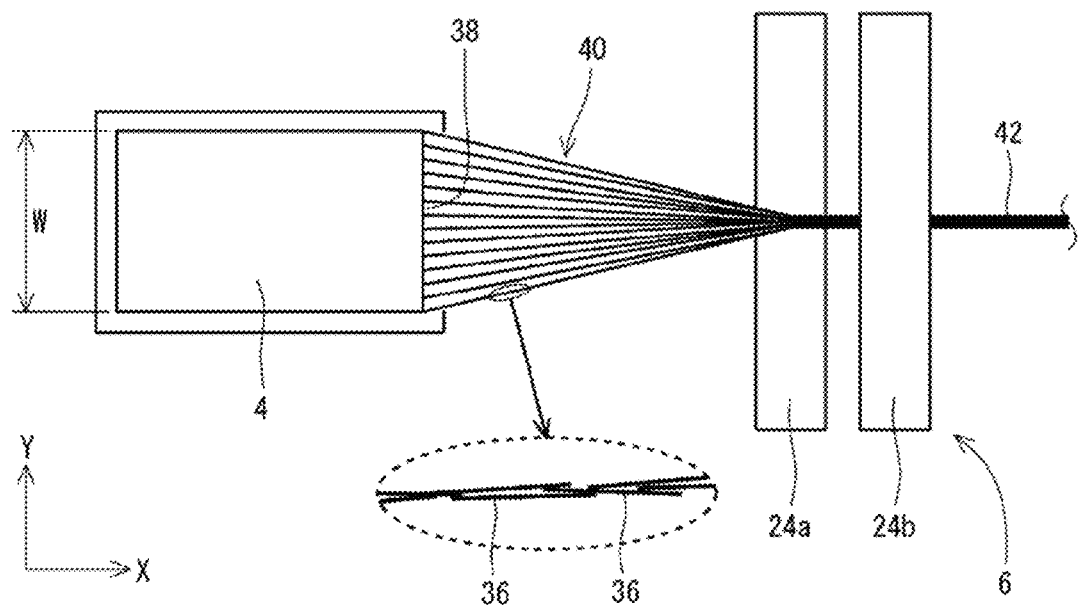
FIG. 6B is a plan view showing the step.

FIG. 6 shows how the drawing is performed. FIG. 6A is a front view, and FIG. 6B is a plan view. As shown in FIG. 6, the drawing is performed on a side surface 38 of the array 4. One or a few carbon nanotubes 36 are held by a chuck and drawn. Following the drawn carbon nanotube(s) 36, other carbon nanotubes 36 are drawn sequentially from the array 4. The carbon nanotubes 36 are bound to one another by van der Waals forces. The carbon nanotubes 36 move downstream (rightward in FIG. 6).

The drawing is continued, so that a web 40 is formed (STEP 2). As shown in FIG. 6A, the thickness (size in the Z direction) of the web 40 is small. As shown in FIG. 6B, the width (size in the Y direction) of the web 40 is large. In other words, the web 40 is in the form of a sheet.

The web 40 is conveyed to the bundler 6. The web 40 is passed between the first and second rollers 24a and 24b. As previously stated, the top 30 of the first roller 24a is located above the bottom 32 of the second roller 24b. Thus, in FIG. 6, the web 40 is in contact with the vicinity of the top 30 of the first roller 24a and also with the vicinity of the bottom 32 of the second roller 24b. The web 40 in this state is subjected to a tension. The bottom of the first roller 24a may be located below the top of the second roller 24b. In this case, the web 40 is brought into contact with the vicinity of the bottom of the first roller 24a and also with the vicinity of the top of the second roller 24b.

Figure 7A:
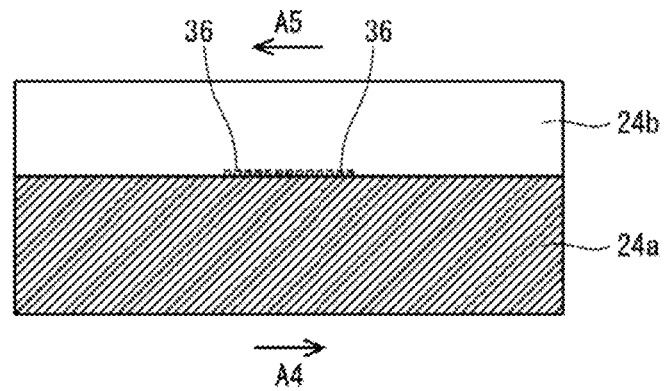
FIGS. 7A, 7B and 7C are cross-sectional views taken along the line VII-VII of FIG. 6.
Figure 7B:
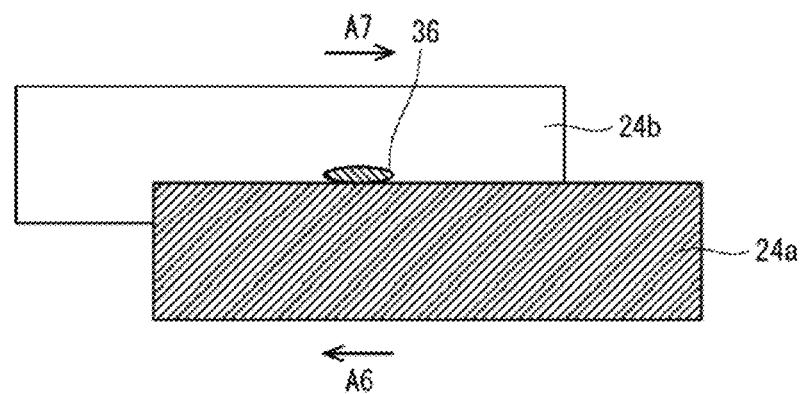
Figure 7C:
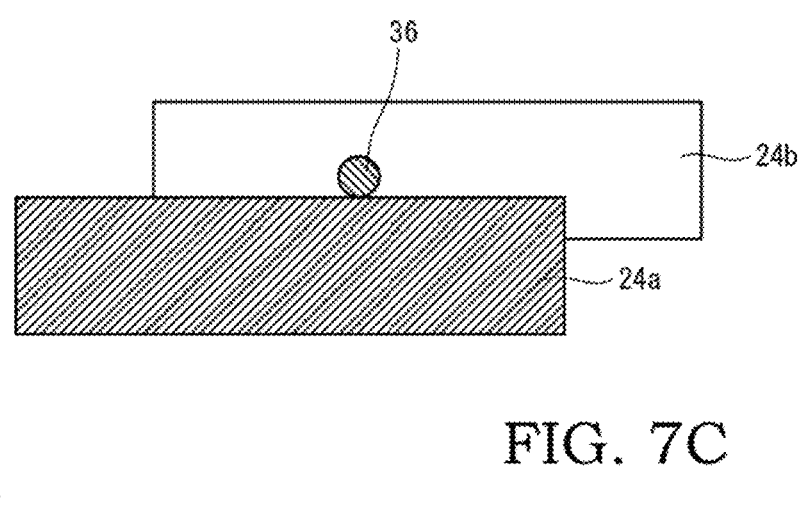

FIGS. 7A, 7B and 7C are cross-sectional views taken along the line VII-VII of FIG. 6. FIG. 7A shows the carbon nanotubes 36 that have just been passed through the bundler 6. The carbon nanotubes 36 are spread in the width direction (Y direction).

The first and second rollers 24a and 24b are moved in the directions indicated by the arrows A4 and A5, respectively, from the state of FIG. 7A. The movement direction of the second roller 24b is opposite to the movement direction of the first roller 24a. The first roller 24a slides in contact with the carbon nanotubes 36 during the movement. The second roller 24b also slides in contact with the carbon nanotubes 36 during the movement. FIG. 7B shows the first and second rollers 24a and 24b that have completed the movements. The sliding leads to the carbon nanotubes 36 being intertwined with one another. Thus, the carbon nanotubes 36 are more closely bundled in FIG. 7B than in FIG. 7A.

The first and second rollers 24a and 24b are moved in the directions indicated by the arrows A6 and A7, respectively, from the state of FIG. 7B. The movement direction of the second roller 24b is opposite to the movement direction of the first roller 24a. The first roller 24a slides in contact with the carbon nanotubes 36 during the movement. The second roller 24b also slides in contact with the carbon nanotubes 36 during the movement. FIG. 7C shows the first and second rollers 24a and 24b that have completed the movements. The sliding leads to the carbon nanotubes 36 being further intertwined with one another. Thus, the carbon nanotubes 36 are more closely bundled in FIG. 7C than in FIG. 7B.

The first roller 24a repeats the movements in the directions indicated by the arrows A4 and A6. In other words, the first roller 24a is reciprocated a plurality of times. The direction of the reciprocation is inclined with respect to the direction in which the web 40 extends (X direction). A preferred inclination angle is 90°. In the present embodiment, the direction of the reciprocation is perpendicular to the direction in which the web 40 extends. In other words, the inclination angle is 90°. The percentage of the reciprocation stroke to the width W of the web 40 (see FIG. 6) is preferably 10% or more, more preferably 20% or more, and particularly preferably 25% or more. This percentage is preferably 1000% or less, more preferably 800% or less, and particularly preferably 700% or less.

The second roller 24b repeats the movements in the directions indicated by the arrows A5 and A7. In other words, the second roller 24b is reciprocated a plurality of times. The direction of the reciprocation is inclined with respect to the direction in which the web 40 extends (X direction). A preferred inclination angle is 90°. In the present embodiment, the direction of the reciprocation is perpendicular to the direction in which the web 40 extends. In other words, the inclination angle is 90°. The percentage of the reciprocation stroke to the width W of the web 40 (see FIG. 6) is preferably 10% or more, more preferably 20% or more, and particularly preferably 25% or more. This percentage is preferably 1000% or less, more preferably 800% or less, and particularly preferably 700% or less.

The second roller 24b need not be moved, and only the first roller 24a may be reciprocated. The first roller 24a need not be moved, and only the second roller 24b may be reciprocated.

The reciprocation of the first roller 24a or second roller 24b leads to the carbon nanotubes 36 being densely bundled (STEP 3). As a result of the bundling, the carbon nanotubes 36 form a bundle 42. The web 40 is continuously fed to the bundler 6. Thus, the bundle 42 of the carbon nanotubes 36 is continuously taken out of the bundler 6. During the continuous feeding and taking-out, the first roller 24a is preferably rotated in the direction indicated by the arrow A1 (see FIG. 2). Further, the second roller 24b is preferably rotated in the direction indicated by the arrow A3 (see FIG. 2).

The carbon nanotubes 36 may be bundled into a bundle before the web 40 reaches the bundler 6. In this case, the bundle is fed to the bundler 6, and the degree of bundling of the bundle is increased by the bundler 6. When the reciprocation of the first roller 24a or second roller 24b is significantly vigorous relative to the drawing rate of the web 40, the bundling could occur before the web 40 reaches the bundler 6. The bundling may be done by effecting the reciprocation in a state where the drawing rate of the web 40 is zero.

The bundle 42 is conveyed to the sprayer 8. In the sprayer 8, drops of a solvent are applied to the bundle 42 (STEP 4). The solvent increases the density of the bundle 42. A volatile solvent is preferred. Preferred examples of the solvent include ethanol, acetone, dimethyl sulfoxide, ammonia, and glycerin. Ethanol and acetone are particularly preferred.

The bundle 42 is conveyed to the dryer 10. In the dryer 10, the bundle 42 is heated (STEP 5). The heating causes evaporation of the solvent. The solvent may be evaporated by blowing air onto the bundle 42 instead of or in addition to heating the bundle 42. The solvent is removed from the bundle 42 as a result of the evaporation, and thus a yarn is obtained. The yarn is wound on a reel or the like.

A yarn may be obtained without the application of solvent drops (STEP 4). A yarn may be obtained without the procedure using the dryer 10.

Preferred examples of the material forming the outer surface of the first roller 24a (i.e., the surface that contacts the carbon nanotubes 36) include a rubber composition, a resin composition, a ceramic or metal material, and a carbon material. Preferred examples of the base component of the rubber composition include natural rubber, acrylonitrile-butadiene rubber, and urethane rubber. Preferred examples of the base component of the resin composition include urethane resin and fluororesin. Preferred examples of the metal material include stainless steel. Preferred examples of the carbon material include graphite. The outer surface of the first roller 24a may be coated with a carbon material such as diamond-like carbon. The first roller 24a whose outer surface is made of any of the above materials is resistant to adhesion of the carbon nanotubes 36. From this viewpoint, the rubber composition is particularly preferred.

Preferred examples of the material forming the outer surface of the second roller 24b (i.e., the surface that contacts the carbon nanotubes 36) include a rubber composition, a resin composition, a ceramic or metal material, and a carbon material. Preferred examples of the base component of the rubber composition include natural rubber, acrylonitrile-butadiene rubber, and urethane rubber. Preferred examples of the base component of the resin composition include urethane resin and fluororesin. Preferred examples of the metal material include stainless steel. Preferred examples of the carbon material include graphite. The outer surface of the second roller 24b may be coated with a carbon material such as diamond-like carbon. The second roller 24b whose outer surface is made of any of the above materials is resistant to adhesion of the carbon nanotubes 36. From this viewpoint, the rubber composition is particularly preferred.

The first part 14a may include another slider instead of the first roller 24a. The second part 14b may include another slider instead of the second roller 24b. Examples of the cross-sectional shapes of the other sliders include: elliptical shapes; elongated, rounded shapes other than elliptical shapes; rectangular shapes; plate shapes; and polygonal shapes other than rectangular shapes (such as triangular, pentagonal, hexagonal, and octagonal shapes). The elongated, rounded shapes include a shape resembling a racetrack of an athletics field. This shape is composed of two opposing semicircles spaced by a given distance and two straight lines drawn between the semicircles.

Figure 8:
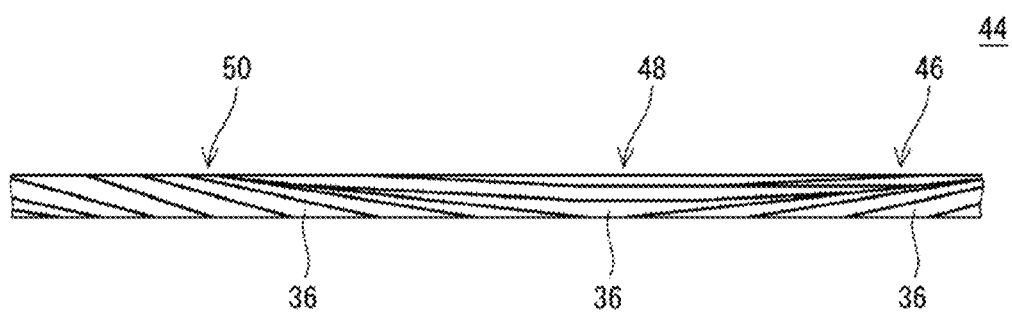
FIG. 8 is an enlarged view showing a part of a carbon nanotube yarn produced by the method of FIG. 5.

FIG. 8 is an enlarged view showing a part of a carbon nanotube yarn 44 produced by the method of FIG. 5. In the yarn 44, a large number of carbon nanotubes 36 are bundled together. The yarn 44 includes a right-twisted portion 46, an intermediate portion 48, and a left-twisted portion 50. In the right-twisted portion 46, the carbon nanotubes 36 are twisted. The twist direction in the right-twisted portion 46 is a rightward direction. This direction is commonly referred to as "S direction". In the intermediate portion 48, the carbon nanotubes 36 are substantially untwisted. In the left-twisted portion 50, the carbon nanotubes 36 are twisted. The twist direction in the left-twisted portion 50 is a leftward direction. This direction is commonly referred to as "Z direction". The twists of the right-twisted portion 46 and left-twisted portion 50 result from the reciprocation of the first roller 24a or second roller 24b. The yarn 44 may have a structure devoid of the intermediate portion 48.

The yarn 44 includes a plurality of right-twisted portions 46 and a plurality of left-twisted portions 50. The yarn 44 has a low residual stress. Preferably, the right-twisted and left-twisted portions 46 and 50 alternate in the longitudinal direction of the yarn 44. The right-twisted and left-twisted portions 46 and 50 may be arranged randomly.

The yarn 44 may have a structure in which the carbon nanotubes 36 are untwisted in their entirety. The yarn 44 that is substantially free of twists can be obtained as a result of cancellation between twisting caused by the forward movement of the reciprocating roller and twisting caused by the backward movement of the reciprocating roller.

In the production method, the yarn 44 having high density can be obtained without die processing. Thus, the yarn 44 is free of fuzz arising from die processing. Additionally, the yarn 44 can easily be obtained by the production method. The yarn 44 may be secondarily subjected to die processing.

The yarn 44 may be subjected to additional twisting. The twisting can be preformed using a known twisting machine. A typical machine is a ring twister.

Figure 9A:
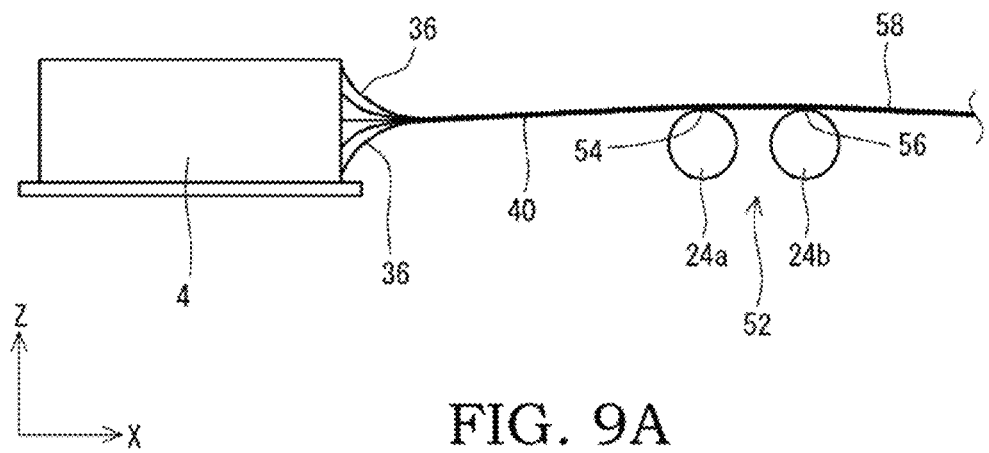
FIG. 9A is a front view showing one step of a production method according to another embodiment of the present invention.
Figure 9B:
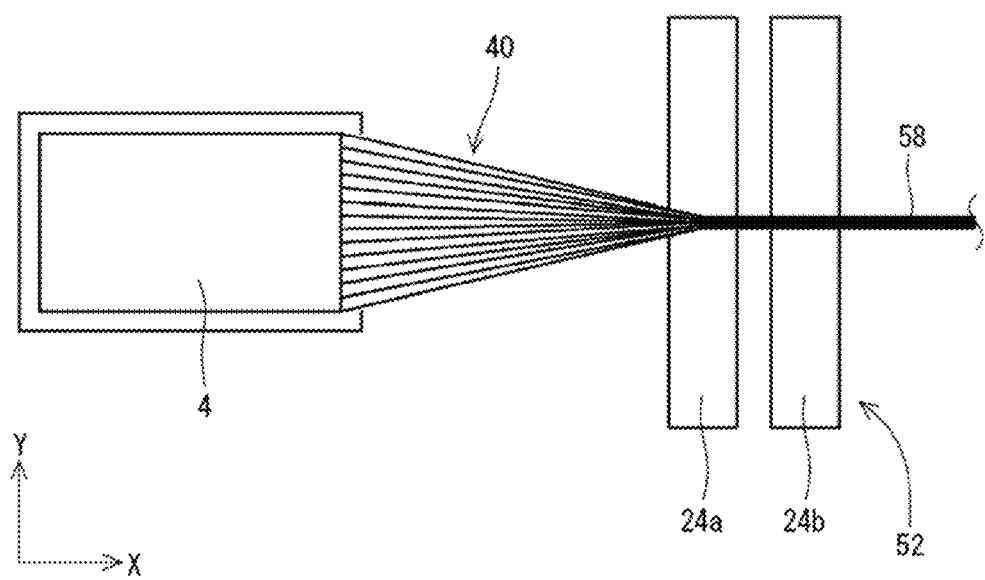
FIG. 9B is a plan view showing the step.

FIG. 9A is a front view showing one step of a production method according to another embodiment of the present invention, and FIG. 9B is a plan view showing the step. FIG. 9 shows an array 4 composed of carbon nanotubes 36 and a bundler 52. The bundler 52 includes a first roller 24a and a second roller 24b. The carbon nanotubes 36 are drawn from the array 4 to form a web 40. The carbon nanotubes 36 are in contact with a top 54 of the first roller 24a and a top 56 of the second roller 24b. The first roller 24a or second roller 24b is reciprocated in the Y direction, and thus the carbon nanotubes 36 are bundled into a bundle 58. The bundler 52 may include three or more rollers. The number of the rollers is preferably up to six.

Figure 10A:
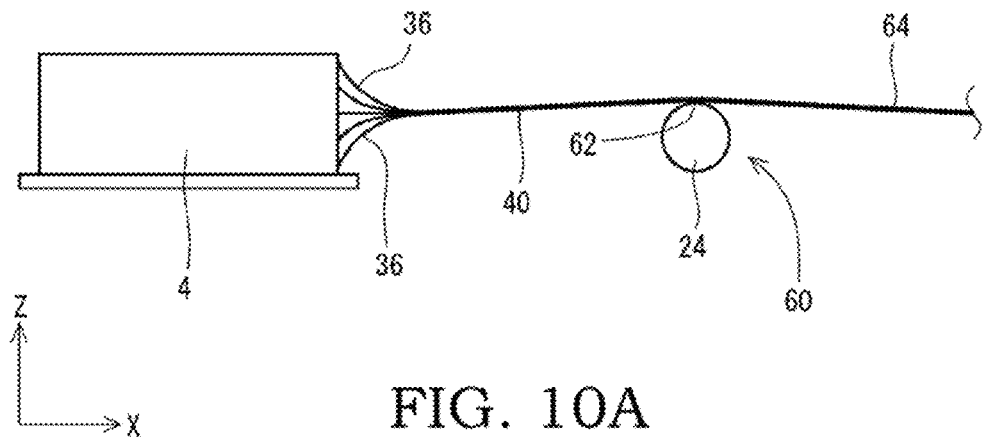
FIG. 10A is a front view showing one step of a production method according to yet another embodiment of the present invention.
Figure 10B:
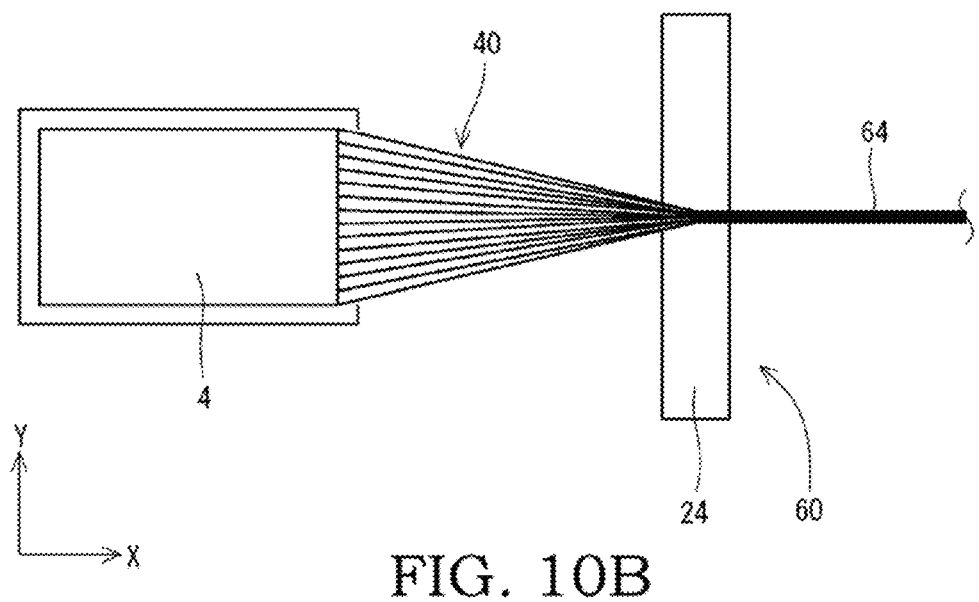
FIG. 10B is a plan view showing the step.

FIG. 10A is a front view showing one step of a production method according to yet another embodiment of the present invention, and FIG. 10B is a plan view showing the step. FIG. 10 shows an array 4 composed of carbon nanotubes 36 and a bundler 60. The bundler 60 includes a single roller 24. The carbon nanotubes 36 are drawn from the array 4 to form a web 40. The carbon nanotubes 36 are in contact with a top 62 of the roller 24. The roller 24 is reciprocated in the Y direction, and thus the carbon nanotubes 36 are bundled into a bundle.

Figure 11A:
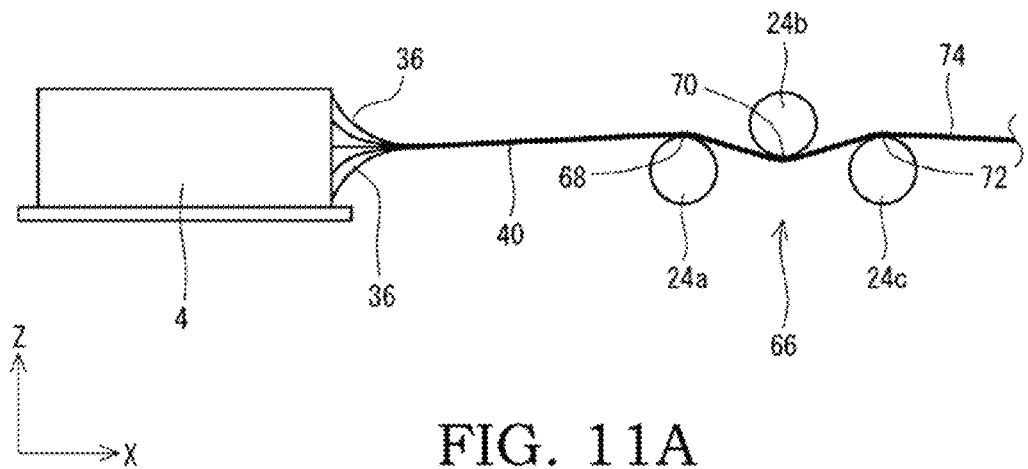
FIG. 11A is a front view showing one step of a production method according to yet another embodiment of the present invention.
Figure 11B:
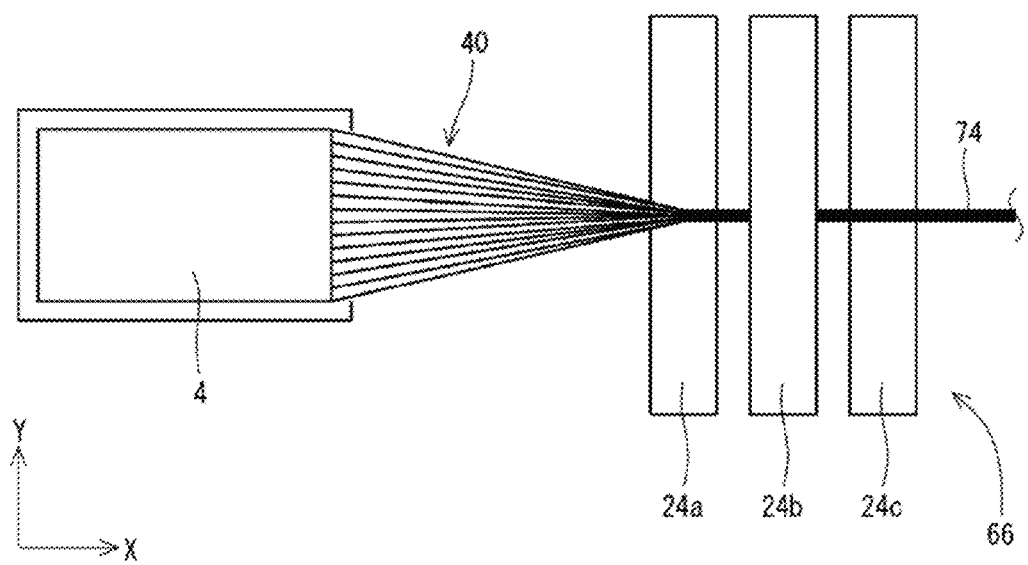
FIG. 11B is a plan view showing the step.

FIG. 11A is a front view showing one step of a production method according to yet another embodiment of the present invention, and FIG. 11B is a plan view showing the step. FIG. 11 shows an array 4 composed of carbon nanotubes 36 and a bundler 66. The bundler 66 includes a first roller 24a, a second roller 24b, and a third roller 24c. The carbon nanotubes 36 are drawn from the array 4 to form a web 40. The carbon nanotubes 36 are in contact with a top 68 of the first roller 24a, a bottom 70 of the second roller 24b, and a top 72 of the third roller 24c. The first roller 24a, second roller 24b, or third roller 24c is reciprocated in the Y direction, and thus the carbon nanotubes 36 are bundled into a bundle 74. The bundler 66 may include four or more rollers 24. The number of the rollers 24 is preferably up to six.

Figure 12:
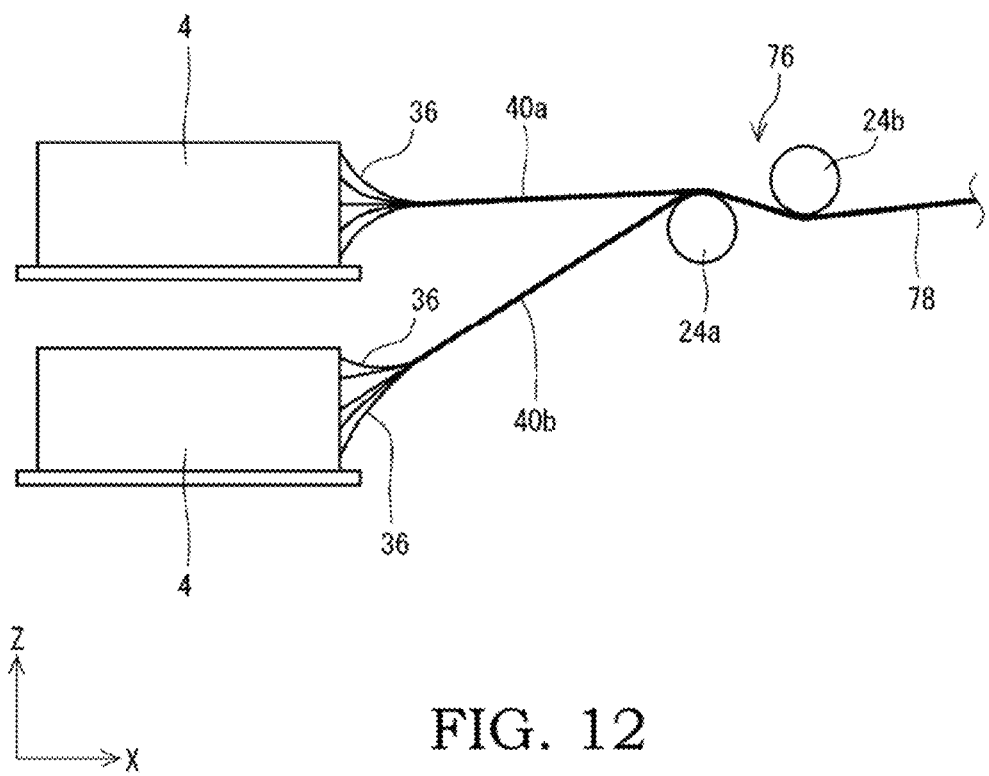
FIG. 12 is a front view showing one step of a production method according to yet another embodiment of the present invention.

FIG. 12 is a front view showing one step of a production method according to yet another embodiment of the present invention. FIG. 12 shows a first array 4a, a second array 4b, and a bundler 76. The second array 4b is located below the first array 4a. In other words, the two arrays 4a and 4b are arranged in the thickness direction (Z direction). The bundler 76 includes a first roller 24a and a second roller 24b. The carbon nanotubes 36 are drawn from the first array 4a to form a first web 40a. The carbon nanotubes 36 are drawn from the second array 4b to form a second web 40b. The first and second webs 40a and 40b are fed to the bundler 76. The first roller 24a or second roller 24b is reciprocated, and thus the carbon nanotubes 36 of the first and second webs 40a and 40b are bundled into a single bundle 78. A single bundle may be obtained from three or more arrays. The arrays may be arranged in the width direction.

EXAMPLES

The following will show the effects of the present invention by means of Examples. The present invention should not be construed in a limited manner on the basis of the description of these Examples.

Example 1

An array having a width of 50 mm was prepared. Carbon nanotubes were gradually drawn from the array to obtain a web. The web was fed to a bundler as shown in FIGS. 2, 3, and 6. The details of the bundler are listed below.

Roller material: Acrylonitrile-butadiene rubber
Roller diameter: 25 mm
Roller width: 100 mm
Roller inclination angle: 90°
Distance between centers of first and second rollers in X direction: 30 mm
Distance between centers of first and second rollers in Z direction: 10 mm
Reciprocation stroke: 30 mm
Reciprocation rate: 150 times/min The carbon nanotubes were bundled by the bundler to obtain a bundle. The bundle feed rate was 40 m/min. Drops of ethanol were applied to the bundle by a sprayer to increase the density of the carbon nanotubes. Ethanol was removed from the bundle by a dryer to obtain a yarn. The yarn produced had a length of 150 m, and the bundle was not broken.

Example 2

A yarn was obtained in the same manner as in Example 1, except that an array having a width of 5 mm was used. The yarn produced had a length of 150 m, and the bundle was not broken.

Comparative Example 1

A yarn was obtained in the same manner as in Example 1, except that the carbon nanotubes were bundled using a die with an inner diameter of 0.05 mm instead of the bundler and that the processing rate was 1 m/min. The bundle was broken once the length of the yarn reached 20 m.

Comparative Example 2

An array having a width of 5 mm was used, and bundling of carbon nanotubes was attempted by means of a die with an inner diameter of 0.02 mm. However, this attempt failed to form a bundle.

[Appearance Inspection]

Figure 13:
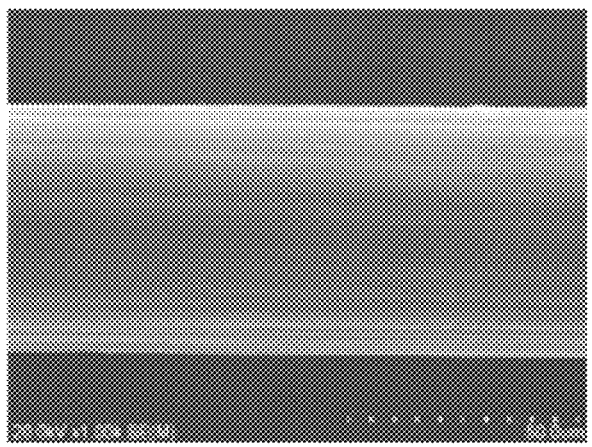
FIG. 13 is a microscope image showing a carbon nanotube yarn obtained by a production method of Example 1 of the present invention.

The yarns were visually inspected for fuzz and neps. The results are shown in Table 1 below. For the yarn obtained by the production method of Example 1, a microscope image was taken at a magnification of 1500 times. FIG. 13 shows this image. FIG. 13 confirms that the yarn was free of fuzz and had an excellent appearance.

TABLE 1

Evaluation results

| | Example 1 | Example 2 | Comparative Example 1 | Comparative Example 2 |
|---|---|---|---|---|
| Array width (mm) | 50 | 5 | 50 | 5 |
| Bundling means | Bundler | Bundler | Die | Die |
| Die diameter (mm) | — | — | 0.05 | 0.02 |
| Processing rate (m/min) | 40 | 40 | 1 | Production failed |
| Length at break (m) | 150 Max | 150 Max | 20 | — |
| Fuzz | Absent | Absent | Present | — |
| Neps | Absent | Absent | Present | — |

INDUSTRIAL APPLICABILITY

The production method according to the present invention can yield a carbon nanotube yarn having high density and high quality.

REFERENCE SIGNS LIST 4 array
4a first array
4b second array
6, 52, 60, 66, 76 bundler
8 sprayer
10 dryer
12 base
14a first part
14b second part
16 actuator
18 groove
20a first mount
20b second mount
22a first support
22b second support
24 roller
24a first roller
24b second roller
24c third roller
26a first arm
26b second arm
28a first rail
28b second rail
36 carbon nanotube
40 web
40a first web
40b second web
42, 58, 64, 74, 78 bundle
44 carbon nanotube yarn
46 right-twisted portion
48 intermediate portion
50 left-twisted portion

The invention claimed is:

1. A production method of a carbon nanotube yarn, the production method comprising the steps of:
    (1) obtaining a web including a large number of carbon nanotubes;
    (2) bringing a first slider and a second slider which is located downstream of the first slider into contact with the carbon nanotubes; and
    (3) reciprocating the first slider in a direction inclined with respect to a direction in which the web extends, and at the same time reciprocating the second slider in a direction opposite to a movement direction of the first slider, to bundle the carbon nanotubes.

2. The production method according to claim 1, wherein the web contacts the first slider and the second slider in the step (2).

3. The production method according to claim 1, wherein the first slider and the second slider used in the steps (2) and (3) are made of a material selected from: a rubber composition containing natural rubber, acrylonitrile-butadiene rubber, or urethane rubber as a base component; a resin composition containing urethane resin or fluororesin as a base component; and a ceramic or metal material.

4. A production apparatus for a carbon nanotube yarn, the production apparatus comprising:
    a first slider that contacts a web including a large number of carbon nanotubes or a bundle obtained from the web;
    a second slider that is located downstream of the first slider and contacts the web or the bundle; and
    a drive mechanism that reciprocates the first slider in a direction inclined with respect to a direction in which the web extends and at the same time reciprocates the second slider in a direction opposite to a movement direction of the first slider.

5. The production apparatus according to claim 4, wherein the first slider and the second slider are made of a material selected from: a rubber composition containing natural rubber, acrylonitrile-butadiene rubber, or urethane rubber as a base component; a resin composition containing urethane resin or fluororesin as a base component; and a ceramic or metal material.

6. A strand comprising a large number of carbon nanotubes, wherein
    the strand includes: a right-twisted portion in which all the carbon nanotubes contained therein are twisted in an S direction; and a left-twisted portion in which all the carbon nanotubes contained therein are twisted in a Z direction.

7. The stand according to claim 6, wherein
the strand includes a plurality of the right-twisted portions and a plurality of the left-twisted portions, and
the right-twisted portions and the left-twisted portions alternate with one another.

8. The strand according to claim 6, wherein
the strand includes an intermediate portion between the right-twisted portion and the left-twisted portion, and
the carbon nanotubes are untwisted in the intermediate portion.

* * * * *